(12) United States Patent
Takase et al.

(10) Patent No.: US 6,415,109 B1
(45) Date of Patent: Jul. 2, 2002

(54) CAMERA AND METHOD OF MANUFACTURING CAMERA

(75) Inventors: Masami Takase, Hino; Takaaki Ue, Hachioji; Yukihiko Sugita; Akiyoshi Tochigi, both of Kokubunji, all of (JP); Shinya Takahashi, Happy Valley (HK)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/697,578

(22) Filed: Oct. 26, 2000

(30) Foreign Application Priority Data

Nov. 2, 1999  (JP) .......................... 11-312749
Nov. 2, 1999  (JP) .......................... 11-312750
Nov. 2, 1999  (JP) .......................... 11-312751
Nov. 2, 1999  (JP) .......................... 11-312752

(51) Int. Cl.$^7$ ..................... G03B 13/10; G03B 17/00
(52) U.S. Cl. ..................... 396/378; 396/379; 396/84
(58) Field of Search ..................... 396/60, 84, 378, 396/379

(56) References Cited

U.S. PATENT DOCUMENTS 4,652,104 A  * 3/1987 Harvey ..................... 396/318
4,928,124 A  * 5/1990 Taniguchi et al. ......... 396/60
6,091,902 A  * 7/2000 Komatsuzaki et al. ...... 396/60

FOREIGN PATENT DOCUMENTS

JP          7072543         3/1995

* cited by examiner

Primary Examiner—David M. Gray
Assistant Examiner—Rochelle Blackman
(74) Attorney, Agent, or Firm—Ostrolenk, Faber, Gerb & Soffen, LLP

(57) ABSTRACT

A camera of this invention incorporates a finder unit capable of changing its magnification corresponding to any one of plural zoom lens barrels (first, second lens barrels) each having different zoom range. When installing the finder unit, first, a positioning pin is inserted into a positioning hole in a rotary frame so as to hold the lens barrel in standard zoom condition. Then, a finder positioning pin is inserted into a cam gear positioning hole and main body positioning hole in finder cam shaft so as to hold a finder lens at a variable magnification position corresponding to the standard zoom condition. With that condition, a zoom driving gear arrangement is meshed with a driving gear portion and cam gear in a rotary frame so that the lens barrel and finder are assembled with each other. This camera realizes reduction of product development term and production cost.

24 Claims, 11 Drawing Sheets

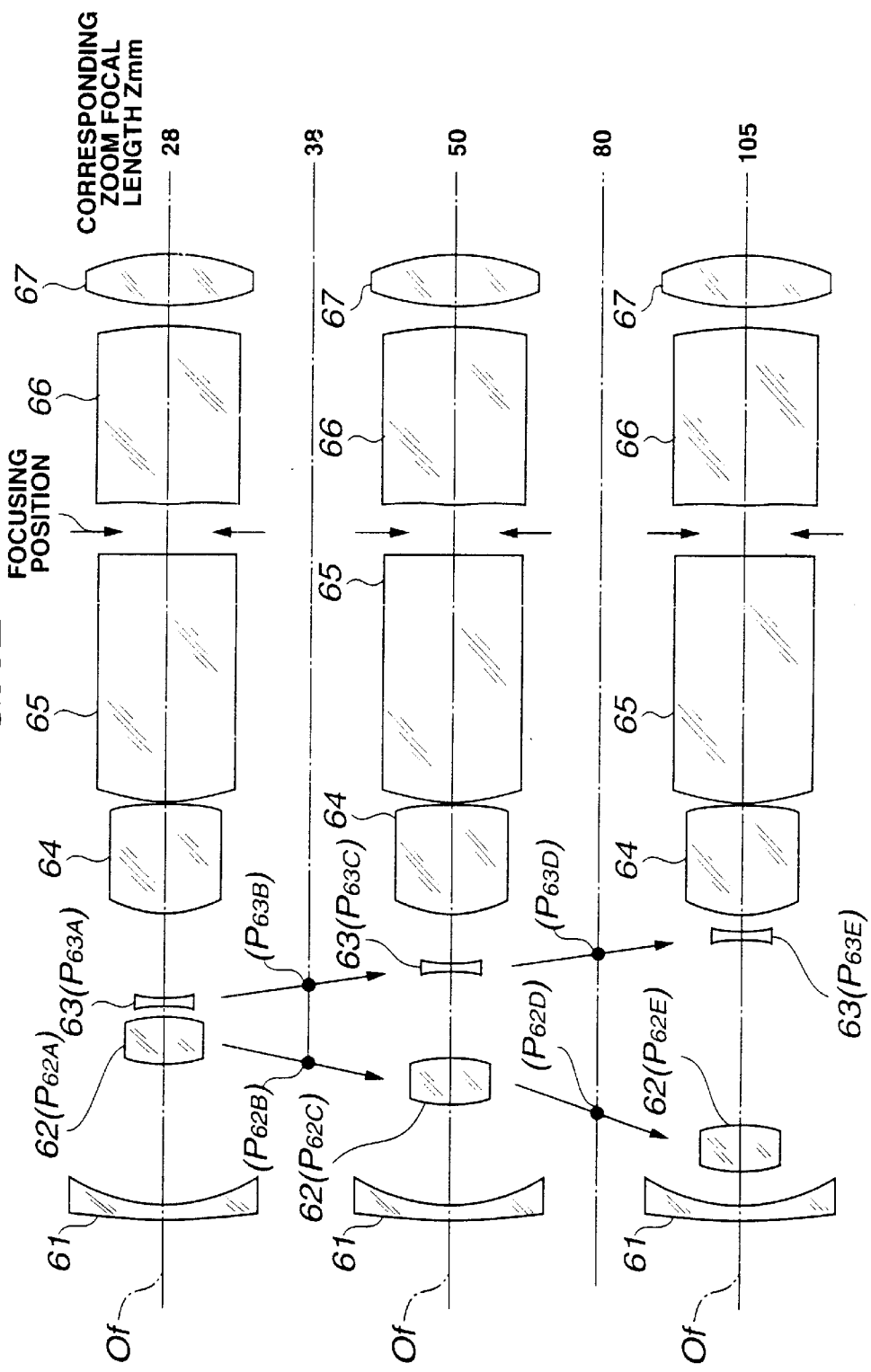

CAMERA AND METHOD OF MANUFACTURING CAMERA

This application claims priority to Japanese Applications No. Hei 11-312749 filed in Japan on Nov. 2, 1999, No. Hei 11-312750 filed in Japan on Nov. 2, 1999, No. Hei 11-312751 filed in Japan on Nov. 2, 1999, and No. He. 11-312752 filed in Japan on Nov. 2, 1999, the contents of which are incorporated by this reference.

BACKGROUND OF THE INVENTION

1. Field of the Invention

The present invention relates to, and method of manufacturing of, a camera incorporating a finder unit and a photographic lens optical system each having variable power.

2. Description of the Related Art

In a conventional camera, generally, a finder optical system and a photographic optical system are designed as a pair. For example, for a photographic optical system having variable power, a finder optical system having variable power corresponding to a focal length range of the photographic optical system is used.

In recent years, a number of cameras and lens barrels having diversified zoom rates have been provided. If a special finder optical system is prepared to correspond to each photographic optical system in such cameras, there will be disadvantages in cost of parts, part management and the like, which prolongs development.

In case of assembly adjustment of the conventional finder optical system and photographic optical system, with the finder optical system fixed at a typical adjustment reference zoom position, the finder unit and the photographic optical system, set to a certain focal length, are adjusted or checked from standpoint of optical performance. The aforementioned adjustment reference zoom position refers to zoom wide end position or zoom tele end position.

Because in the conventional camera, only one zoom photographic optical system can be mounted on the finder optical system, the adjustment reference zoom position is always fixed to a predetermined position, so that the adjustment procedure is not troublesome.

However, because the finder optical system corresponds to the zoom photographic optical system one to one, the problems associated with product development, part cost and part management still exist if a finder optical system is made to correspond to a plurality of photographic optical systems.

Japanese Patent Application Laid-open (JP-A) No. 7-72543 has proposed a motor-driven lens shutter camera provided with a zoom lens. This camera is provided with a zoom encoder based on binary code so as to determine whether the lens barrel is located in a zoom section or accommodation drive section. If it is located in the zoom section, forward/reverse rotation of the zoom drive motor is changed over by a manual switch, and if it is located in the accommodation drive section, stop of power feed to the motor is inhibited.

In the camera disclosed in the above described Japanese Patent Application Laid-open (JP-A) No. 7-72543, to make a finder optical system correspond to plural photographic optical systems, the lens barrel has to be stopped at a target reference zoom position for adjustment and check on assembly process. However, the lens barrel is hard to stop at an accurate zoom position. Particularly, for the adjustment of variable magnification position of the finder unit relative to the zoom position of the lens barrel, the adjustment of interlocking with the electric flash unit or the like, the lens barrel has to be positioned more accurately. Therefore, a special electric control unit for adjustment needs to be prepared for the adjustment and check.

OBJECT AND SUMMARY OF THE INVENTION

The present invention has been devised to solve the above described problems. According to the present invention, a finder optical system can correspond to a plurality of photographic optical systems, and therefore, an object of the invention is to provide a camera which shortens product development and reduces production cost. Another object of the invention is to provide a method for producing the camera which facilitates setting of adjustment positions of the finder optical system and photographic lens optical system and adjustment of the installation thereof.

In the camera according to the present invention, a first lens barrel has a first photographic optical system capable of changing magnification in a first variable magnification range and can engage the first photographic optical system at a predetermined variable magnification condition. A second lens barrel has a second photographic optical system capable of changing magnification in a second variable magnification range overlapping at least partially the first variable magnification range, and can engage the second photographic optical system at the predetermined variable magnification condition. The camera of the present invention comprises a camera main body allowing either the first lens barrel or the second lens barrel to be selectively installed thereon, a finder unit having a finder optical system capable of changing the magnification corresponding to the first variable magnification range and second variable magnification range and a finder engaging unit capable of engaging the finder optical system at a variable magnification condition corresponding to the predetermined variable magnification condition. When the camera of the present invention is assembled, the first and second lens barrels are engaged at the predetermined variable magnification condition and at the same time, the finder unit is engaged at a variable magnification condition corresponding to the predetermined variable magnification condition.

The manufacturing method of camera of the present invention comprises the steps of: selecting any one of plural photographic optical systems each having different variable magnification range; installing a lens frame unit corresponding to a variable magnification range of the selected photographic optical system on the camera main body; engaging the lens frame unit at a predetermined variable magnification condition; engaging a finder unit having a finder optical system having variable magnification capacity corresponding to a variable magnification range possessed by the plural photographic optical systems corresponding to the predetermined variable magnification condition; installing the finder unit to the camera main body; and releasing an engagement between the lens frame unit and finder unit.

Other features and advantages of the present invention will be apparent from the following description.

BRIEF DESCRIPTION OF THE DRAWINGS

FIG. 12 is an allocation diagram of finder optical system showing variable magnification drive of the finder unit to be incorporated in the camera of the embodiment;

DETAILED DESCRIPTION OF THE PREFERRED EMBODIMENTS

Hereinafter, the preferred embodiments of the present invention will be described with reference to the accompanying drawings.

Figure 1:
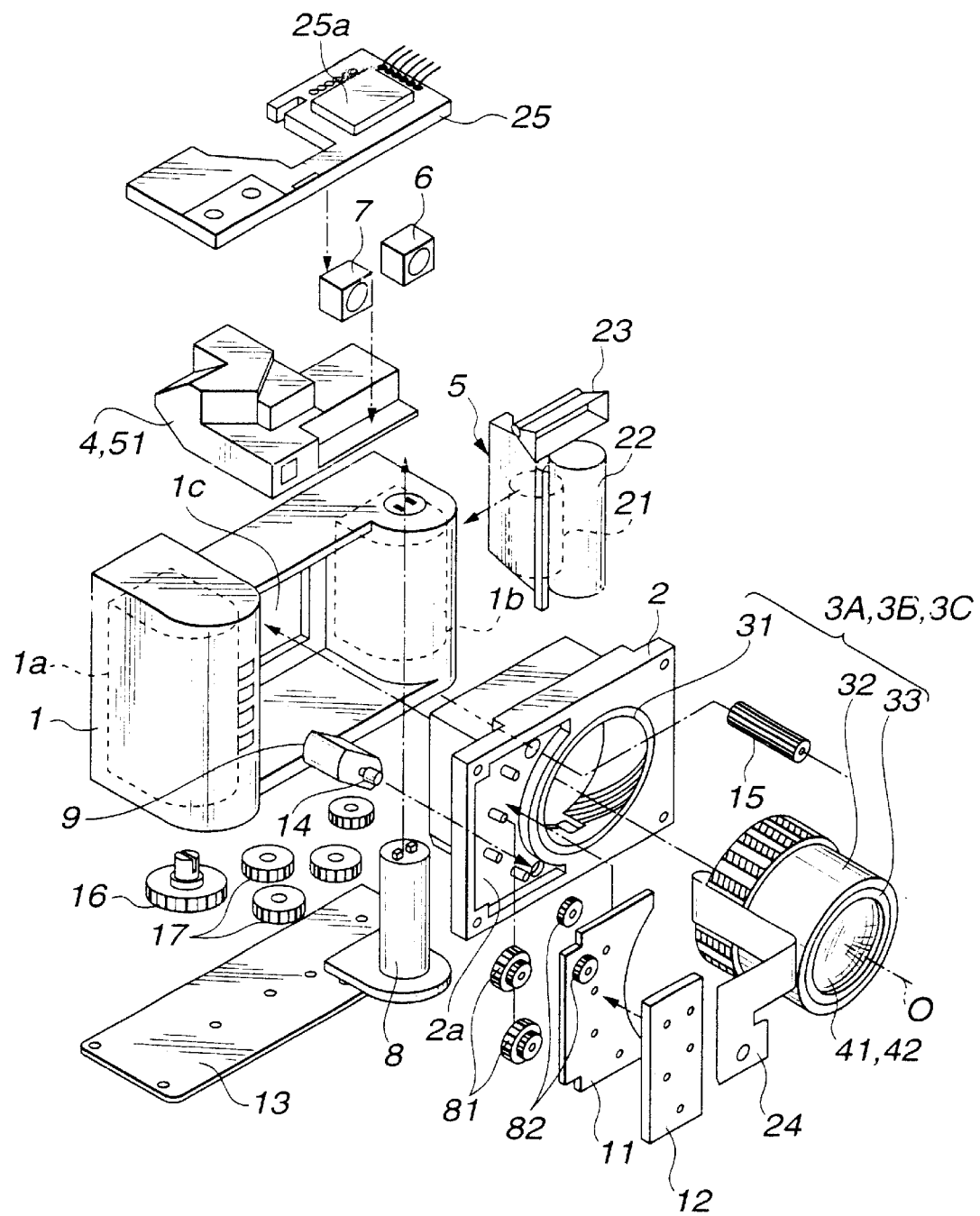
FIG. 1 is a disassembly perspective view of major components of a camera incorporated in a finder unit according to an embodiment of the present invention.

FIG. 1 is a disassembly perspective view of major components of a camera incorporating a finder unit according to an embodiment of the present invention.

The camera of this embodiment can select any one of a plurality of different zoom lens barrels incorporating different photographic optical systems each capable of adjusting a focal length within each of different plural focal length ranges. Further, this camera allows an incorporated finder unit to be adapted to any one of the aforementioned plural kinds of the zoom lens barrels. Then, the zoom lens barrel can be positioned at a predetermined zoom position and with such a positioning, installation of components related to the finder unit, optical system performance and mechanical function can be checked.

The camera comprises a camera main body 1 including a patrone chamber 1a, a spool chamber 1b, aperture portion 1c and the like, lensboard 2, zoom lens barrel 3A built in the lensboard 2 and capable of changing magnification by a predetermined amount and capable of being collapsed, electronic flash unit 5 and driving power battery 21 disposed on a side of the spool chamber of the camera main body 1, driving power battery 21, finder unit 4, which is a real-image finder unit, disposed on top of the camera main body, measuring distance units 6, 7 for projecting and receiving a beam, and control main board 25 disposed on top of the finder unit 4 and containing LCD display unit 25a. Further, the aforementioned camera includes a feeding motor unit 8 disposed within the spool chamber 1b, film driving portion base plate 13 installed on the bottom of the camera main body 1, film feeder driving gear arrangement 17, fork gear 16, zoom motor 9, which is an electric driving source incorporated in the lensboard 2 and containing a pinion 14, zoom driving gear arrangement 81 disposed in the gear chamber 2a of the lensboard 2, zoom driving portion base plates 11, 12 mounted in front of the gear chamber 2a, finder zoom driving gear arrangement 82 disposed on zoom base plates 11, 12 and the finder main body 51, and flexible printed circuit board 24 mounted on the aforementioned lens barrel 3A for focusing and shutter control.

Instead of the zoom lens barrel 3A, any one of zoom lens barrels 3B,3C, each of which can be collapsed and change magnification by a different predetermined rate in a zoom range (variable magnification range), can be selected and incorporated in the lensboard 2. The structure of the zoom lens barrel 3A will be described in detail, and as to the lens barrels 3B, 3C, only components different from those of lens barrel 3A will be described.

The electronic flash unit 5 contains an electronic flash charging capacitor 22 and a flash bulb portion 23 having an electric flash bulb and a reflector.

The zoom lens barrel 3A is driven (driven for variable magnification) by the zoom motor 9 through zoom driving gear arrangement 81 and a lens frame driving long gear 15. Details of the structure are shown in disassembly perspective view of FIG. 2 and longitudinal sectional views indicating a collapsed condition and a tele condition of FIGS. 3, 4.

That is, the zoom lens barrel 3A comprises a fixed frame 31 supported by the lensboard 2, a rotary frame 32 supported rotatably and movably by the fixed frame 32, a movable frame 33 supported movably with respect to the rotary frame 32 when the rotation is restricted, first group lenses 41, which are first photographic optical system having an optical axis O, second group lenses 42 (FIGS. 3, 4), a first group frame 36 (see FIGS. 3, 4) supported by the movable frame 33 for holding the first group lenses 41, a second group frame 37 (see FIGS. 3, 4)supported by the movable frame 33 for holding the second group lenses 42, a shutter mechanism 38 supported by the movable frame 33 and float key 34, which restricts rotations of the movable frame 33 and second group frame 37 and moves with the rotary frame 32.

First group lenses 43 and second group lenses 44 (see FIG. 10), which are the second photographic optical system, are incorporated in the zoom lens barrel 3B, which can be incorporated instead of the zoom lens barrel 3A. Then, first group lenses 45 and second group lenses 46 (see FIG. 11), which are the third photographic optical system, are incorporated in the zoom lens barrel 3C. Then, the zoom lens barrels 3B, 3C have different zoom ranges.

The aforementioned fixed frame 31 includes an opening portion 31c for catching the lens frame driving long gear 15, helical threads 31a on an inner periphery and straight engaging grooves 31b.

The rotary frame 32 has a helicoid spur complex gear portion 32a capable of meshing with helical threads 31a for the fixed frame 31 and the long gear 15, which is a spur gear having a long tooth width, provided on an outer periphery thereof.

Further, it has helical threads 32b, cam grooves 32c and circumferential protruded portion 32d, provided on an inner periphery. Further, the aforementioned rotary frame 32 has a position restricting groove 32e, which is an engaging means. A lens frame position restricting pin 39, which is an engaging means, can be inserted into an end face on the side of the collapsed barrel thereof.

The aforementioned movable frame 33 has helical threads 33a meshing with the helical threads 32b of the rotary frame 32 provided on an outer periphery thereof. Movable frame 33 has straight guide grooves 33b, which are an engaging means in which the straight guide portions 34b of the float key 34 are inserted freely slidably, the guide grooves 33b being provided in an inner periphery.

The aforementioned first group frame 36 is driven for focusing relative to the movable frame 33 along the optical axis O by a focusing mechanism(not shown)incorporated in the movable frame 33.

The second group frame 37 on an outer periphery has a straight guide groove 37b, into which the straight guide portion 34b of the float key is inserted freely slidably, and cam followers 37a, which are inserted freely slidably into the cam grooves 32c in the rotary frame.

The float key 34 is comprised of a ring plate 34h and the ring plate 34h includes outward extruded portions 34a, which are inserted freely slidably into the straight guide grooves 31b in the fixed frame 31, fixing holes 34c for fixing a rotary frame nipping ring member 35, and three positioning holes 34d, 34e, 34f, which are engaging means. Straight guide portions 34b are provided on the top and the bottom of the ring plate 34h such that they are extended forward along the optical axis O.

The ring member 35 is attached to the float key 34 and the circumferential protruded portion 32d of the rotary frame 32 is sandwiched by the ring member 35 and the ring base plate 34h of the float key 34. Therefore, if the rotary frame 32 is moved while rotating, the float key 34 is moved by the fixed frame 31 along the optical axis O with the rotary frame 32 while a rotation of the float key 34 is restricted. Consequently, the movable frame 33, the first group frame 36 and the second group frame 37 are moved forward or backward while a rotation thereof is restricted by the float key 34.

The lens frame positioning pin 39 can be inserted into each of the three positioning holes 34d, 34e, 34f and these positioning holes 34d, 34e, 34f serve for wide end positioning, tele end positioning and finder setting reference positioning, respectively. When the zoom lens barrel 3A is assembled and adjusted, the lens frame positioning pin 39 is inserted into one of the three positioning holes 34d, 34e, 34f and then, a tip thereof is engaged with the positioning groove 32e in the rotary frame 32. When this lens frame positioning pin 39 is engaged, the rotary frame 32 is positioned at each adjustment rotation position. With this condition, the finder is installed and optical characteristic and the like are adjusted and detected. A detail of each adjusting operation will be described later.

Figure 3:
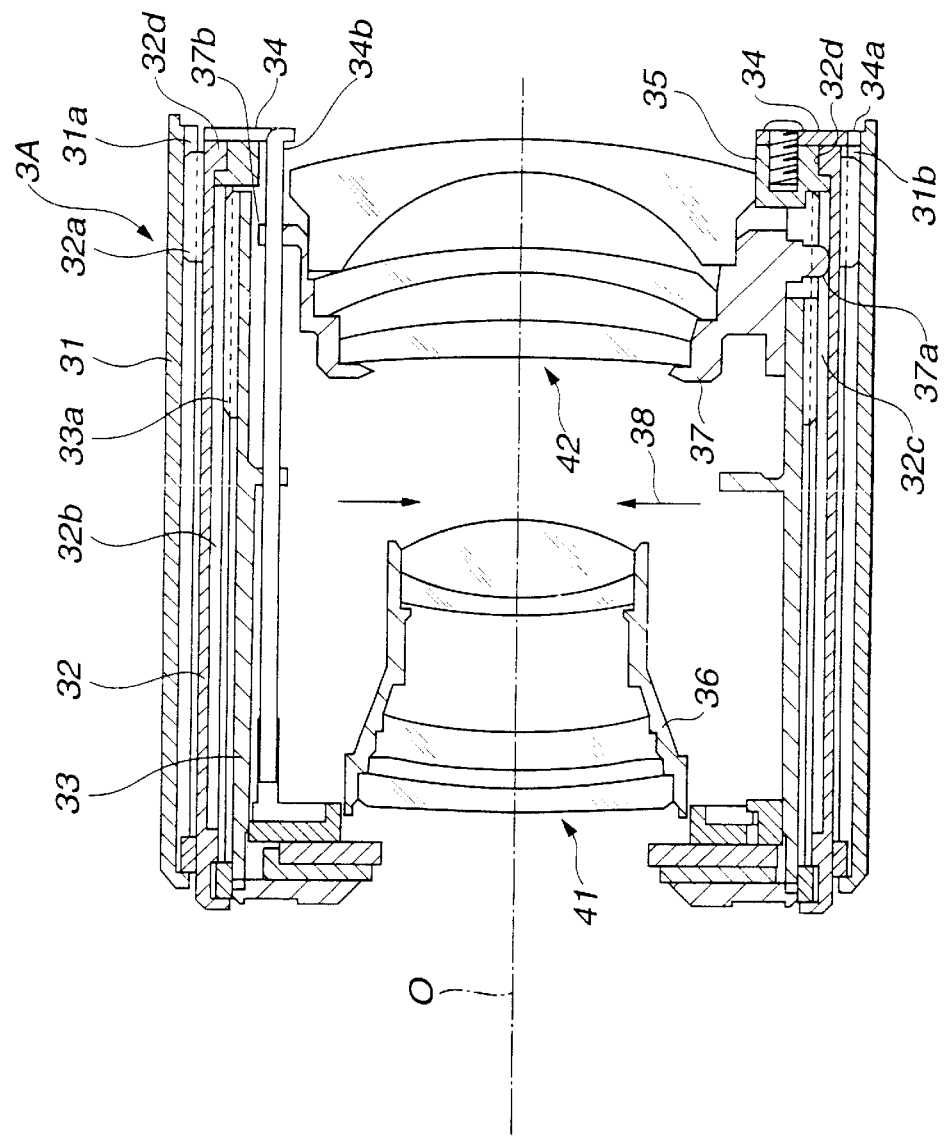
FIG. 3 is a longitudinal sectional view of a collapsed condition of the zoom lens barrel to be incorporated in the camera of the embodiment.
Figure 4:
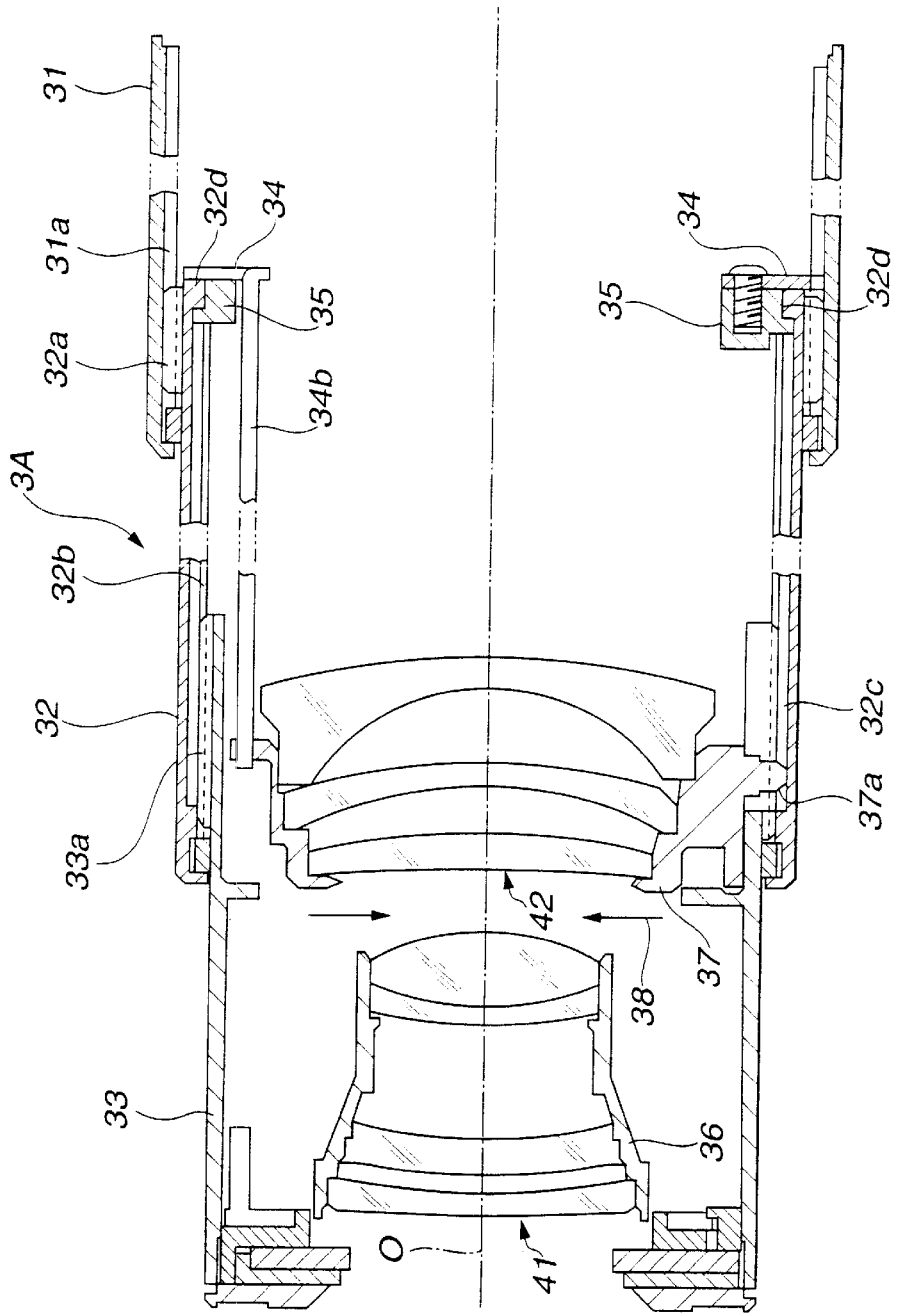
FIG. 4 is a longitudinal sectional view of a tele condition (extended condition) of the zoom lens barrel to be incorporated in the camera of the embodiment.

In the zoom lens barrel 3A having the above described structure, if the rotary frame 32 is driven from a collapsed position shown in FIG. 3 by the lens frame driving long gear 15, the rotary frame 32 is fed to wide position and tele position (see FIG. 4) along the optical axis O by the helical threads 31a of the fixed frame 31.

On the other hand, the movable frame 33 is supported in a manner such that its rotation is restricted by the float key 34. If the rotary frame 32 is moved forward or backward, the movable frame 33 is fed end moved further along the optical axis O by the helical threads 32b of the rotary frame 32, so that it is fed to the wide position or tele position (see FIG. 4). At the same time, the first group frame 36 holding the first group lenses 41 is also fed with the movable frame 33. Additionally, the first group frame 36 is also driven for focusing by a focus driving portion (not shown).

The second group frame 37, which holds the second group lens 42, is supported in a manner such that its rotation is restricted by the float key 34. The second group frame 37 is fed with the rotary frame 32 and further, advanced or retracted by the cam grooves 32c through the cam followers 37a with a rotation of the rotary frame 32.

The finder unit 4 can coincide with the plural zoom lens barrels 3B, 3C (described later) each having a different focal length as well as the zoom lens barrel 3A. The finder unit 4 has a variable magnification range which covers the entire zoom ranges of the zoom lens barrels 3B, 3C in addition to the zoom range of the zoom lens barrel 3A.

Figure 5:
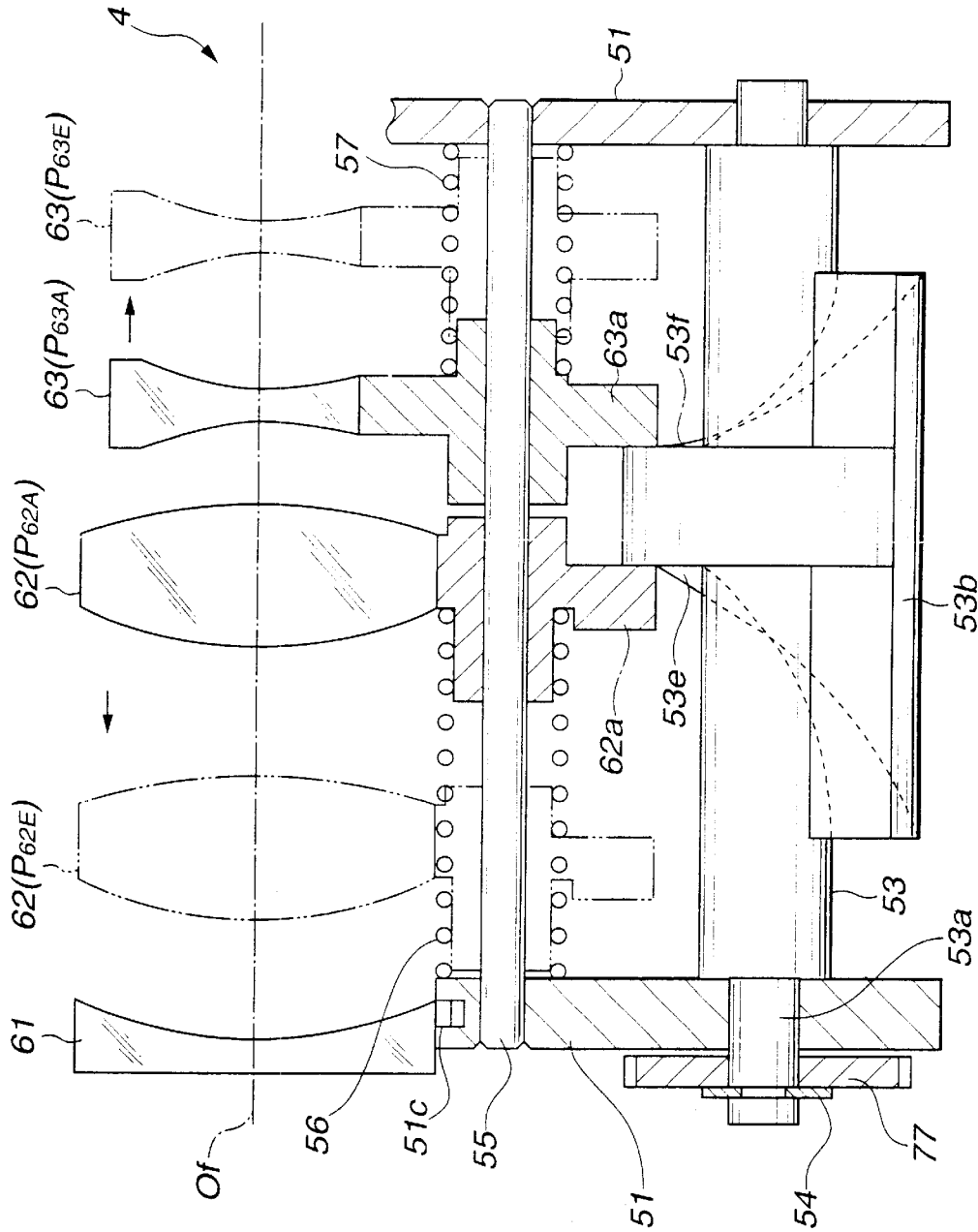
FIG. 5 is a longitudinal sectional view of finder optical system of a finder unit to be incorporated in the camera of the embodiment.

The finder unit 4 is incorporated in the finder main body 51 as shown in the longitudinal sectional view of the finder optical system of FIG. 5 and the finder optical system allocation diagram indicating varied magnification of FIG. 12. The finder unit comprises a finder cam shaft 53 supported rotatably by the finder main body 51, a finder guide shaft 55 supported by the finder main body 51, a first finder lens 61, which is an objective lens disposed along the finder optical axis of and constituting a finder optical system capable of changing magnification by a predetermined rate, a second finder lens 62 and a third finder lens 63, which are retractable, a first finder prism 64, second finder prism 65, a third finder prism 66 and an eyepiece lens 67.

The finder cam shaft 53 is comprised of a shaft portion 53a and a finder cam portion 53b and supported in parallel to the finder optical axis Of.

Figure 6:
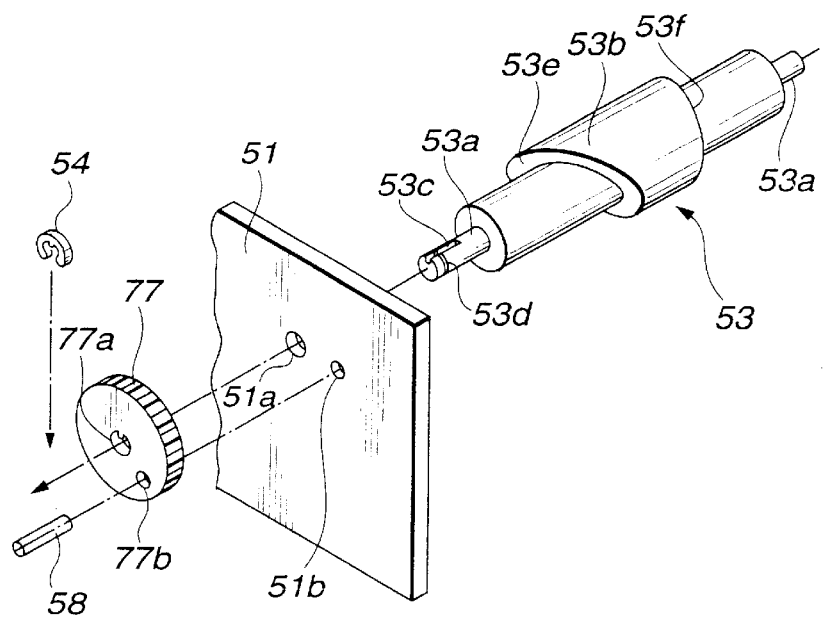
FIG. 6 is a disassembly perspective view of a finder cam shaft driving unit of the finder unit to be incorporated in the camera of the embodiment.

The shaft portion 53a is supported rotatably by a shaft bearing portion 51a in the finder main body 51 as shown in the disassembly perspective view of FIG. 6. A finder cam gear 77 constituting one of the finder zoom driving gear arrangement 82 is attached to a front end of the shaft portion 53a. A key groove 53c and an E-ring groove 53d are provided in an engagement portion of the shaft portion 53a. A stopper protrusion 77a of the fit finder cam gear 77 engages with the key groove 53c. The E-ring 54 is mounted on the E-ring groove 53d to prevent the finder cam gear 77 from being slipped out.

The finder cam portion 53b has cylindrical end face cams 53e, 53f, which are in a sliding contact with cam followers 62a, 63a of the second and third finder lenses.

The first finder lens 61 is fixed to the finder main body 51 through a concave portion 51c. The second finder lens 62 and third finder lens 63 are supported freely slidably by the finder shaft 55 along the finder optical axis Of. The second finder lens 62 is urged toward the eyepiece lens by a spring 56 and the third finder lens 63 is urged toward the first finder lens by a spring 57.

The finder cam shaft 53 is driven by the finder zoom driving gear arrangement 82 through the zoom driving gear arrangement 81, which is a transmitting means from the zoom motor 9. With a rotation of the cam shaft 53, the second finder lens 62 and third finder lens 63 are driven by the finder cam portion 53b. The finder lenses 62, 63 are driven corresponding to each focal length in synchronism with the zoom drive of the lens barrel. That is, the magnification of the finder optical system is varied synchronously with a magnification achieved by the zoom drive of the lens barrel, so that visual field rate is maintained substantially constant within the zoom drive range of the lens barrel.

The finder unit 4 is applicable to the plural zoom lens barrels 3B, 3C each having a different focal length as well as the zoom lens barrel 3A already described above. The maximum moving ranges of the second finder lens 62 and third finder lens 63 for varying power include at least zoom ranges of the applicable zoom lens barrels 3A, 3B, 3C. The second finder lens 62 can move from a wide end position P62A having the widest visual field to tele end position P62E having the smallest visual field. The third finder lens 63 can move from the wide end position P63A having the widest visual field to the tele end position P63E having the smallest visual field.

The finder cam gear 77 and finder main body 51 have gear's positioning hole 77b and main body's positioning hole 51b, respectively, which are engaging means in which a finder positioning pin 58, which is an engaging means, can be inserted, such that those positioning holes oppose each other. When this finder positioning pin 58 is inserted into the positioning holes 77b, 51b, the second and third finder lenses 62, 63 are located at each preliminarily determined installation reference variable magnification position. With such a position, the finder unit 4 is installed onto the camera. Meanwhile, the aforementioned finder installation reference variable magnification position is a position corresponding to a zoom standard position at focal length z50 mm within common zoom range focal length z38 mm–80 mm shared by all the zoom lens barrels 3A, 3B, 3C.

The finder installation reference variable magnification position does not always have to correspond to the aforementioned zoom standard position of the focal length z50 mm, but may be a variable magnification position other than the zoom standard position, which is any zoom position within the common zoom range focal length z38 mm–80 mm shared by the zoom lens barrels 3A, 3B, 3C and determined by the lens frame positioning pin 39.

With such a structure, a magnified subject image corresponding to a magnified subject image at the time of zooming with the zoom lens barrel 3A is observed through the eyepiece lens 67 of the adjusted finder unit 4. This is the same if any one of the zoom lens barrels 3B, 3C is incorporated.

Figure 7:
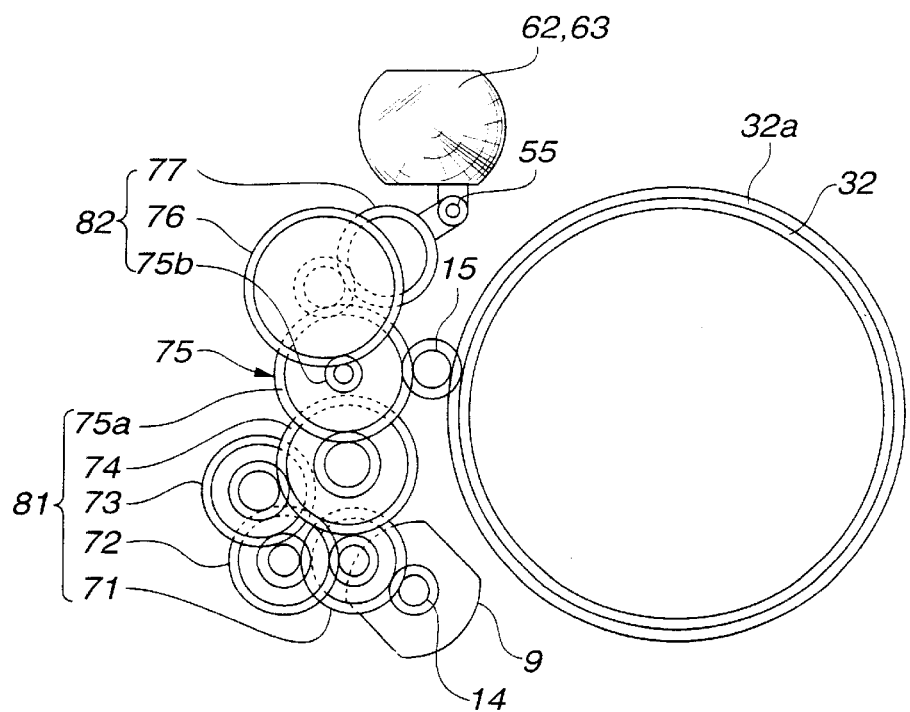
FIG. 7 is a diagram showing allocation of the lens barrel and zoom driving gear arrangement of finder unit in the camera of the embodiment.
Figure 8:
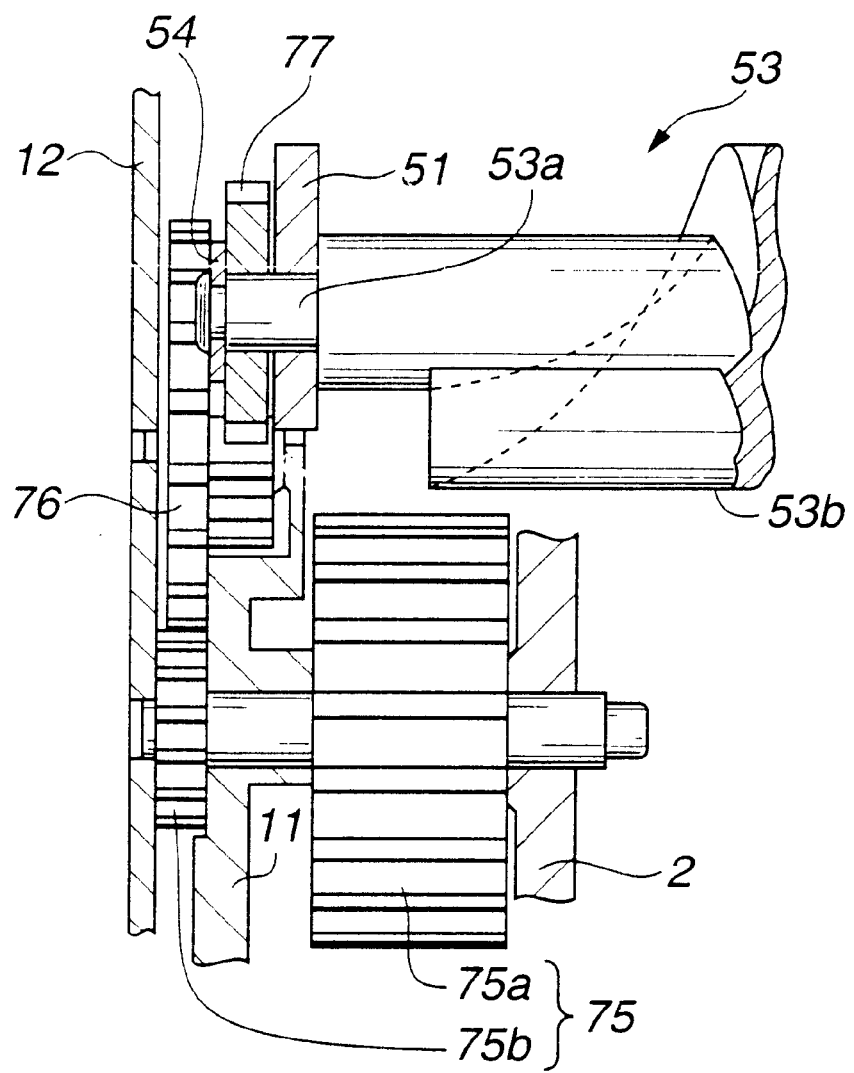
FIG. 8 is a longitudinal sectional view of the finder cam shaft driving unit of the finder unit in the camera of the embodiment.

The driving system for the zoom lens barrels 3A, 3B, 3C and finder unit 4 will now be described. FIG. 7 is a diagram showing allocation of the zoom driving gear arrangement for the lens barrel and the finder unit. FIG. 8 is a longitudinal sectional view of the finder cam shaft driving unit of the finder unit.

A driving force of the zoom motor 9 is transmitted to the lens frame driving long gear 15 which meshes with the helicoid spur complex gear portion 32a of the rotary frame 32 through the pinion 14 and zoom driving gear arrangement 81 to drive the rotary frame 32. Further, the driving force of the zoom motor 9 is transmitted from the zoom driving gear arrangement 81 to the finder zoom driving gear arrangement 82 including the finder cam gear 77, to drive the finder cam shaft 53.

The zoom driving gear arrangement 81 comprises a two-stage zoom gear 71, a two-stage zoom gear 72, a two-stage zoom gear 73, a two-stage zoom gear 74 and a large gear portion 75a of the two-stage gear 75, which mesh with each other.

The finder zoom driving gear arrangement 82 comprises a small gear portion 75b of the two-stage zoom gear 75, a two-stage finder zoom gear 76 and the finder cam gear 77.

Figure 9A:
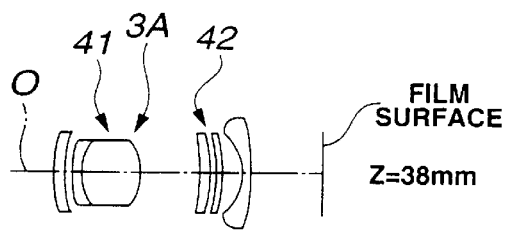
FIG. 9(A) is a diagram showing zoom wide drive of the photographic lens in a zoom lens barrel capable of being incorporated in the camera of the embodiment.
Figure 9B:
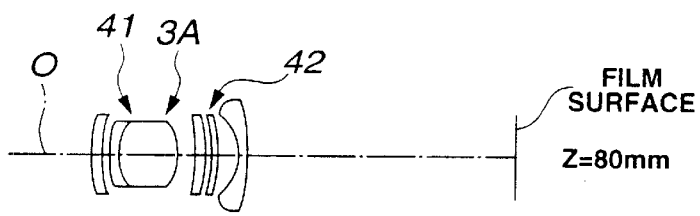
FIG. 9(B) is a diagram showing zoom tele drive of the photographic lens in the zoom lens barrel capable of being incorporated in the camera of the embodiment.

In the zoom lens barrel 3A, by driving the rotary frame 32 by the lens frame driving long gear 15, the first group lenses 41 and second group lenses 42 of the first photographic optical system are moved backward or forward as shown by the zoom driving condition of FIGS. 9(A), 9(B). The zoom range (variable magnification range) is 38 mm to 80 mm in terms of focal length Z. FIG. 9(A) indicates the state in which the focal length Z is 38 mm. FIG. 9(B) indicates the state in which the focal length Z is 80 mm. A subject image at the time of zoom is formed on a film face.

Figure 10A:
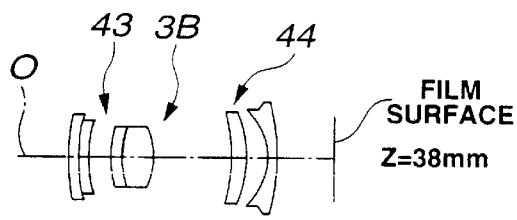
FIG. 10(A) is a diagram showing zoom wide drive of the photographic lens in another zoom lens barrel capable of being incorporated in the camera of the embodiment.
Figure 10B:
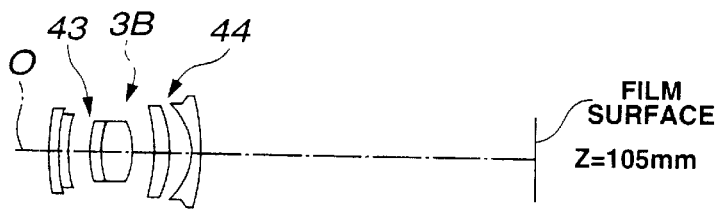
FIG. 10(B) is a diagram showing zoom tele drive of the photographic lens in the zoom lens barrel capable of being incorporated in the camera of the embodiment.

If the zoom lens barrel 3B is used instead of the zoom lens barrel 3A, when the rotary frame is driven, the first group lenses 43 and second group lenses 44 of the second photographic optical system are moved backward or forward as indicated by the diagrams for extending the photographic lens of FIGS. 10(A), 10(B). The zoom range (variable magnification range) is from 38 mm to 105 mm in terms of focal length Z. FIG. 10(A) shows the state in which the focal length Z is 38 mm. FIG. 10(B) shows the state in which the focal length Z is 105 mm.

Figure 11A:
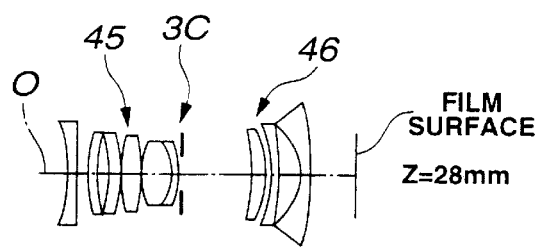
FIG. 11(A) is a diagram showing zoom wide drive of the photographic lens in another zoom lens barrel capable of being incorporated in the camera of the embodiment.
Figure 11B:
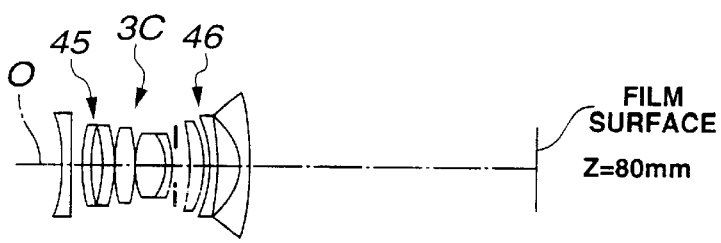
FIG. 11(B) is a diagram showing zoom tele drive of the photographic lens in the zoom lens barrel capable of being incorporated in the camera of the embodiment.

If the zoom lens barrel 3C is used, when the rotary frame is driven, the first group lenses 45 and second group lenses 46 of the third photographic optical system are moved backward or forward as indicated by the diagrams for extending the lens of FIGS. 11(A), 11(B). The zoom range (variable magnification range) is from 28 mm to 80 mm in terms of focal length Z. FIG. 11(A) shows the state in which the focal length Z is 28 mm. FIG. 11(B) shows the state in which the focal length Z is 80 mm.

The finder unit installation reference position (reference magnification position) in the respective zoom lens barrels 3A, 3B, 3C is a standard focal length Z0 within the common zoom range of the respective barrels, for example, 50 mm.

The aforementioned finder unit installation reference position (reference magnification position) is not always restricted to a zoom position corresponding to the standard focal length, but may be a zoom position of a predetermined focal length within the common zoom range of the respective barrels.

Figure 13:
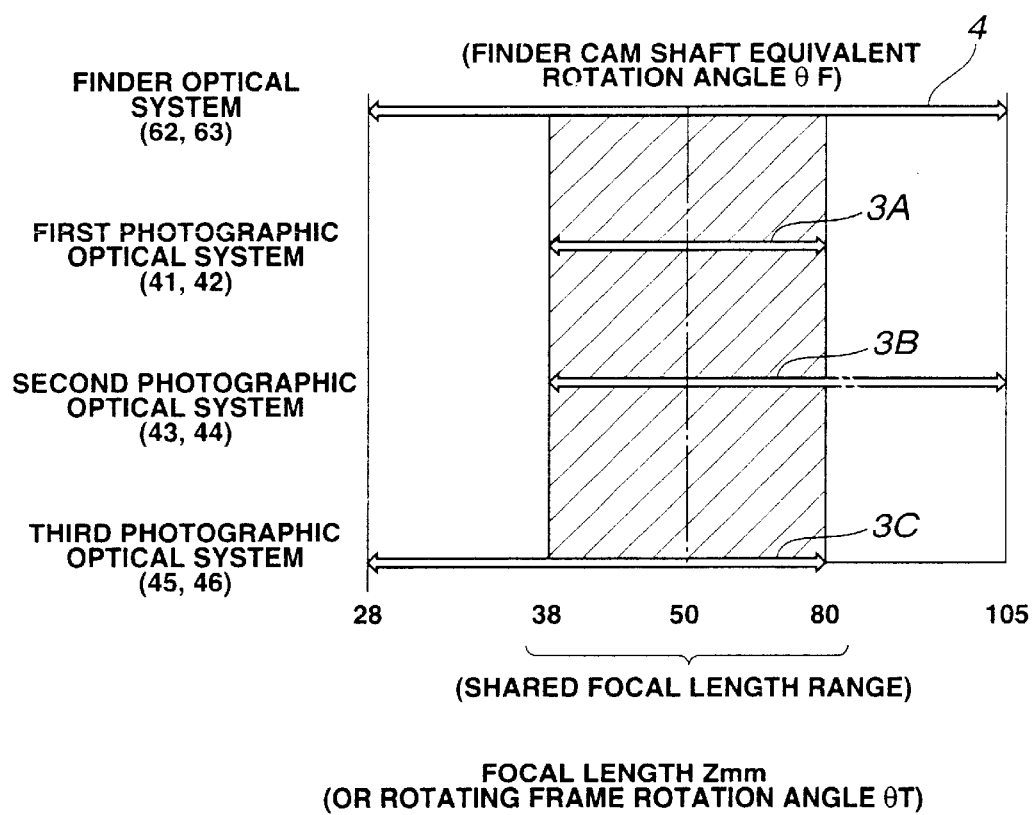
FIG. 13 is a diagram showing zoom ranges of respective photographic optical systems of three zoom lens barrels capable of being incorporated in the camera of the embodiment and all zoom range allowing the magnification to be changed of the finder unit.

In this embodiment, it is assumed that a rotation angle of the rotary frame 32 in the zoom lens barrel 3A from a rotation position for giving the standard focal length Z0 to the other focal length Z coincides with a rotation angle of the rotary frame in the zoom lens barrels 3B, 3C from the rotation position for giving the standard focal length Z0 to the rotation position for giving the same focal length Z (see FIG. 13).

A lens barrel structure that uses a rotary frame which is required to be rotated at a different angle with respect to the same focal length Z in the zoom lens barrels 3A, 3B, 3C, a gear ratio of the finder zoom driving gear arrangement needs to be changed for each of the zoom lens barrels 3A, 3B, 3C. This will be described later as an example of a modification.

The camera is in its accommodation state when the first group lenses and second group lenses, advanced or retracted as shown in FIGS. 9(A), 9(B), FIGS. 10(A), 10(B) and FIGS. 11(A), 11(B) are collapsed toward a film face.

On the other hand, the magnification of the finder unit 4 will be described with reference to FIG. 12 which provides a diagram showing the driving condition for magnification of the finder optical system. The second finder lens 62 and third finder lens 63 of the finder optical system for magnification of the finder unit 4 are driven by the finder cam 53b. The applicable lens barrels 3A, 3B, 3C can advance or retract within a magnification zoom range shown in FIG. 12 to cover the focal length Z of 28 mm to 105 mm, which is the entire zoom range of the lens barrels 3A, 3B, 3C.

That is, if the lens barrel 3C corresponds to the wide end focal length Z of 28 mm, the second finder lens 62 and third finder lens 63 are located at respective magnification positions P62A, P63A.

If the lens barrels 3A, 3B correspond to the wide end focal length Z of 38 mm, the second finder lens 62 and third finder lens 63 are located at respective magnification positions P62B, P63B.

If the lens barrels 3A, 3B, 3C correspond to the common zoom standard focal length Z of 50 mm, the second finder lens 62 and third finder lens 63 are located at respective magnification positions P62C, P63C.

If the lens barrels 3A, 3C correspond to the tele end focal length Z of 80 mm, the second finder lens 62 and third finder lens 63 are located at respective magnification positions P62D, P63D.

If the lens barrel 3B corresponds to the tele end focal length Z of 105 mm, the second finder lens 62 and third finder lens 63 are located at respective magnification positions P62E, P63E.

To collapse the zoom lens barrel, the rotary frame 32 is rotated from the wide end rotation position in the retraction direction. At this time, the finder cam shaft 53 is also rotated in the wide direction. Thus, by collapsing the zoom lens barrel, the second and third finder lenses 62, 63 are moved to the positions P62A, P63A along a contact cam face of the finder cam 53b. However, according to this embodiment, the second and third finder lenses do not have to be driven from the widest angle side in the wide end direction in the magnification range of the lens barrels 3A, 3B, 3C. The contact cam face of the finder cam 53b has a flat portion.

FIG. 13 is a diagram showing zoom ranges of respective photographic optical systems of the zoom lens barrels 3A, 3B, 3C and the entire zoom range in which the power of the finder unit 3 can be changed. The transverse axis indicates an equivalent rotation angle ΘF of the finder cam shaft with respect to changes in the rotation angle ΘT of the rotary frame and focal length Z.

As shown in FIG. 13, the adjustable focal length ranges in the zoom ranges of respective photographic optical systems (first group, second group lenses 41, 42 and 43, 44 and 45, 46) of the zoom lens barrels 3A, 3B, 3C are 38–80 mm, 38–105 mm and 28–80 mm respectively. The magnification range of the finder optical system (first, second, third finder lenses 61, 62, 63) covers the focal length range 28–105 mm in all of the zoom ranges of the aforementioned lens barrels. The common focal length range of the zoom lens barrels 3A, 3B, 3C is 38–80 mm, which includes the standard focal length of 50 mm.

The following will describe the installation adjustment operation of the zoom lens and the finder unit, and a preparatory operation for checking the optical and mechanical performance and function of the camera of this embodiment at the wide end and tele end of the zoom lens barrel.

Figure 2:
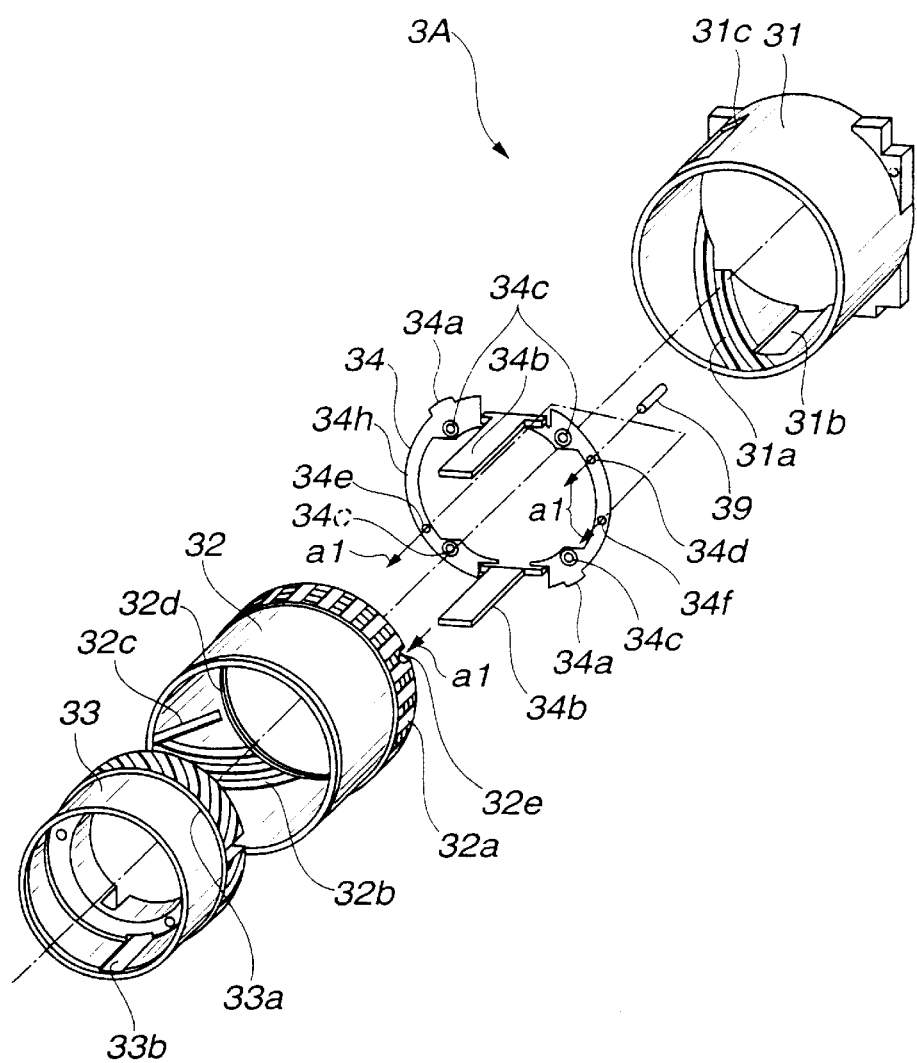
FIG. 2 is a disassembly perspective view of a zoom lens barrel built in a camera of the embodiment.

First, the installation adjustment of the finder unit 4 will be described. To adjust the zoom lens barrel 3A, as shown in FIG. 2, the lens frame positioning pin 39 is inserted into the reference positioning hole 34f in the float key 34. By rotating the rotary frame 32, a front end of the lens frame positioning pin 39 is engaged with the positioning groove 32e in the rotary frame 32. Consequently, the zoom lens barrel 3A is fixed to a state in which the first group and second group lenses 41, 42 are extended to the focal length Z50 mm, which is the standard zoom position.

If any one of the zoom lens barrels 3B, 3C are incorporated also, by inserting the aforementioned lens frame positioning pin 39, the first group and the second group lenses 43, 44 or the first group and the second group lenses 45, 46 are held at the focal length Z50 mm, which is the standard zoom position.

On the other hand, when the zoom lens barrel is located at the standard zoom position having the focal length Z50 mm, the rotation of the finder cam shaft 53 is restricted by the finder positioning pin 58 thereby the finder unit 4 is positioned at the finder installation reference position (magnification reference position of the finder optical system to obtain a magnification corresponding to the focal length Z50 mm and also a field factor). As a result, the finder optical system is positioned (engaged) at a predetermined magnification condition.

With one of the finder zoom driving gear arrangement 82 removed, the finder positioning pin 58 is inserted into the positioning hole 77b in the finder gear 77 and then, by rotating the finder cam shaft 53, the aforementioned finder positioning pin 58 is inserted into the positioning hole 51b in the finder main body 51. When this finder positioning pin 58 is inserted, the second and third finder lenses 62, 63 of the finder optical system are positioned at P62C, P63C shown in FIG. 12 and the finder unit 4 is held at the finder installation reference position, which is a magnification reference position for a magnification corresponding to the standard zoom condition having the focal length Z50 mm of the zoom lens barrels 3A, 3B, 3C.

Then, the finder zoom driving gear arrangement 82 is meshed with the finder cam gear 77 and the lens frame positioning pin 39 and finder positioning pin 58 are pulled out. Consequently, the zoom lens barrel 3A, 3B or 3C and the finder unit 4 are positioned at the zoom standard position, that is, finder installation magnification reference position.

If any one of the zoom lens barrels 3A, 3B, 3C is zoomed to its wide end, tele end or middle zoom position by the zoom motor 9, as shown in FIG. 13, the finder optical system of the finder unit 4 is also moved to a magnification position that corresponds to that zooming.

As described above, if the zoom lens barrel and the finder unit are installed at the zoom standard position or other predetermined zoom position within the common zoom range instead of being installed at the wide end or tele end, unlike a conventional camera, any one of zoom lens barrels having different zoom ranges and the finder unit can be installed easily with excellent precision.

If a lens barrel which can be moved between a photographic position in which the lens barrel is protruded from the camera and a non-photographic position in which the lens is accommodated is used, the finder installation reference position is not restricted to the common zoom range, but may be located between the photographic position and the non-photographic position. In this case, by setting the finder installation reference position at a position in which the rotation of the rotary frame from the installation reference position to the common zoom range is equal for all the lens barrels, the same result as that which is described above can be achieved.

The following will describe the preparation for checking the optical and mechanical performance and function of the camera at the zoom wide end and tele end with respect to the zoom lens barrel (action for moving the photographic lens to adjustment/detection position).

The zoom lens barrel 3A must be held at the zoom wide end or tele end in order to carry out the optical and mechanical performance and function check. To hold the zoom lens barrel 3A at the wide end, the positioning pin 39 is inserted into the positioning hole 34d in the float key 34 and a front end thereof is engaged with the positioning groove 32e in the rotary frame 32. As a result the rotary frame 32 is rotated so that the first and second group lenses 41, 42 are located at the wide end. Further, to maintain the tele end condition, the positing pin 39 is inserted into the positioning hole 34e in the float key 34 and the front end thereof is engaged with the positioning groove 32e in the rotary frame 32. As a result the rotary frame 32 is rotated so that the first, second group lenses 41, 42 are located at the tele end position.

The optical and mechanical performance and function of the zoom lens barrel 3A held at the zoom wide end or zoom tele end and its relation with the finder unit are also checked. If the flash bulb portion 23 of the electric flash unit 5 is interlocked with zooming of the lens barrel, the interlocking condition can be checked.

If one of the zoom lens barrels 3B, 3C is used instead of the zoom lens barrel 3A, a rotation angle of the rotary frame 32 with respect to the zoom wide end or zoom tele end is different because the zoom range is different from the zoom range of zoom lens barrel 3A. Therefore, because the position restricting groove 32e of the rotary frame 32 is shifted, it is necessary to provide the position restricting groove at another position in the rotary frame or place the positioning holes 34d, 34e at different positions on the side of the float key 34.

Because the camera of this embodiment allows any one of the zoom lens barrels 3A, 3B, 3C each having a plurality of different photographic lens optical systems with a different focal length adjustment range to be selected and installed in a single finder unit 4 of variable power, no special finder unit needs to be prepared for each zoom lens barrel. Consequently, product development can be shortened and part management is simplified, thereby achieving a low cost.

Further, when assembling the zoom lens barrel with the finder unit, by inserting the lens frame positioning pin 39 into the positioning groove in the rotary frame, a number of zoom lens barrels can be positioned to the standard zoom condition or a predetermined zoom condition easily. At the same time, by inserting the finder positioning pin 58 into the positioning hole in the finder cam gear, the finder unit 4 can be positioned securely and easily at the reference magnification position that corresponds to the standard zoom condition or the predetermined zoom condition. Then, by coupling the zoom driving gear arrangements for driving the zoom lens barrel and the finder unit when they are positioned, the zoom lens barrel and the finder unit can be assembled with each other easily.

Further, if the lens frame positioning pin 39 is inserted into the positioning groove in the rotary frame 32 when the optical and mechanical performance and function of the camera at the zoom wide end or zoom tele end of the zoom lens barrel are checked, the rotary frame 22 can be fixed to the zoom wide end or zoom tele end easily. Thus, unlike a conventional camera, a special electric driving unit or the like for zoom drive at the time of assembly is not necessary, which results in a simplified assembly adjustment.

Although according to this embodiment, advancement and retraction of the zoom lens barrel in the direction of the optical axis is carried out by helicoid coupling, it is needless to say that cam coupling can be used instead. Where cam coupling is used, if a predetermined flat portion is provided at a cam position corresponding to the zoom wide end or zoom tele end, the lens barrel can be stopped at a predetermined zoom position more accurately. Because, unlike the cam coupling, the helicoid coupling in this embodiment disables the flat portion this invention is effective.

Next, a variation of a camera according to an embodiment of the present invention capable of having any one of a plurality of zoom lens barrels each having a different rotation angle of the rotary frame and extendible to the same focal length, will be described. In the camera according to this variation, the major components are the same as the above described embodiment, and therefore, only components that are different from the above invention will be described.

Figure 14:
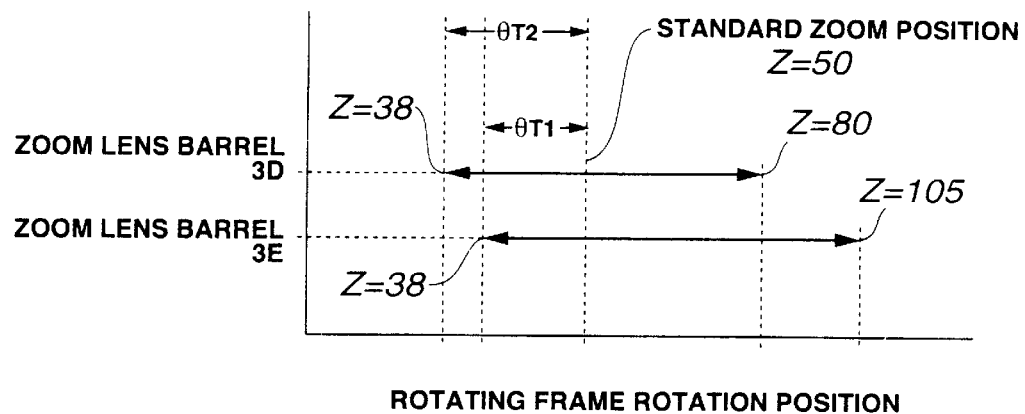
FIG. 14 is a diagram showing changes of the zoom condition with respect to a rotation angle of the rotary frames of two zoom lens barrels capable of being incorporated in a camera according to a modification of the camera of the above embodiment.

FIG. 14 shows a diagram indicating changes in the zoom position of the zoom lens barrel with respect to the rotation angle of the rotary frame. It is assumed that the zoom range of the zoom lens barrel 3D is from the focal length Z38 mm at the wide end to the focal length Z105 mm at the tele end, that the zoom range of the zoom lens barrel 3E is from the focal length Z38 mm at the wide end to the focal length Z80 mm at the tele end, and that the rotation angles of the rotary frames for zooming from the standard zoom condition having the focal length Z50 mm to the wide end having the focal length Z38 mm are different between the zoom lens barrels 3D and 3E. For example, it is assumed that a rotation angle $\Theta T1$ of the zoom lens barrel 3D is smaller than a rotation angle $\Theta T2$ of the zoom lens barrel 3E.

In the camera according to this variation, the lens frame positioning pin 39 is inserted into the positioning groove in the rotary frame according to the same method as the above described embodiment and then, the zoom lens barrels 3D and 3E are set to the standard zoom condition. Then, the finder positioning pin 58 is inserted into the positioning hole in the finder cam gear in order to set the finder unit 4 at the reference modification position corresponding to the standard zoom condition.

The finder zoom driving gear arrangement is meshed with the zoom driving gear arrangement 81, which is the driving force transmitting means of FIG. 7 in the above setting condition. Because the rotation angle of the rotary frame upon zooming differs as described above, the gear ratio of the finder zoom driving gear arrangement needs to be changed depending on the zoom lens barrel 3D or 3E.

Figure 15:
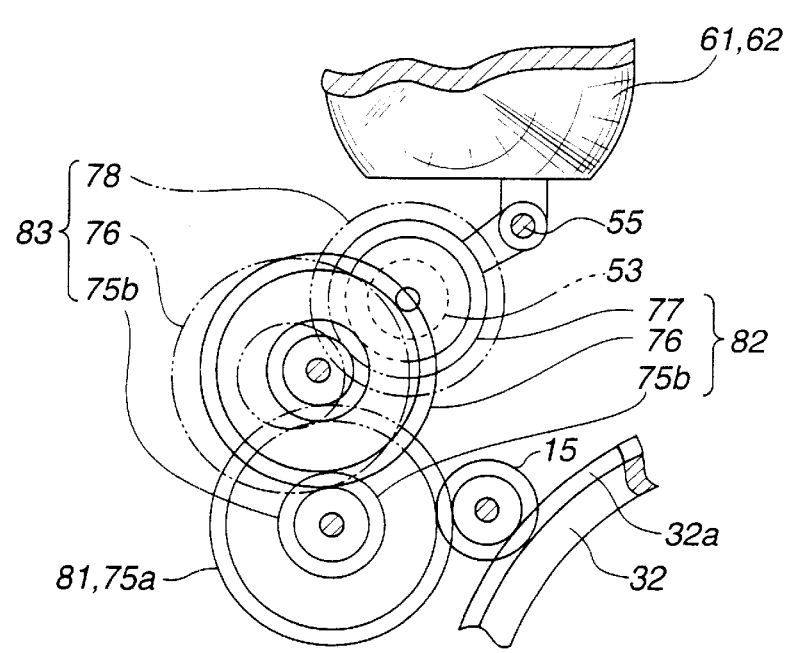
FIG. 15 is a diagram showing allocation of the lens barrel and zoom drive gear arrangement of finder unit in the camera of the modification of the present invention.

FIG. 15 is a diagram showing allocation of the lens barrel and finder unit zoom driving gear arrangement when the zoom lens barrel 3D or 3E is built in.

The finder zoom driving gear arrangement 82, which is a driving force transmitting means shown in FIG. 15, comprises a small gear portion 75 of the two-stage zoom gear 75, two-stage finder zoom gear 76, and finder cam gear 77. The finder zoom driving gear arrangement 83, which is the driving force transmitting means, comprises a gear arrangement using a finder cam gear 78 having more teeth than the finder cam gear 77 instead of the finder cam gear 77.

When the zoom lens barrel 3D is installed, the finder zoom driving gear arrangement 82 is applied es a gear arrangement to mesh with the zoom driving gear arrangement 81, and the finder cam gear 77 is installed on the finder cam shaft 53 of the finder unit 4 at the reference magnification position. When the zoom lens barrel 3D arrives at the focal length Z38 mm, the finder unit 4 is set to a magnification position corresponds to the focal length Z38 mm.

On the other hand, when the zoom lens barrel 3E is built in, the finder zoom driving gear arrangement 83 is meshed with the zoom driving gear arrangement 81 and the finder cam gear 78. The finder cam gear 78 is the gear mounted to the finder cam shaft 53 of the finder unit 4 and has more teeth than and meshed with the gear 77.

When the zoom lens barrel 3E is installed, by installing the finder zoom driving gear arrangement 83 having the finder cam gear 78 having more teeth, the rotation angle of the finder cam shaft 53 with respect to the zoom driving gear arrangement 81 is reduced. Thus, when the rotary frame is rotated by a rotation angle ΘT2 (larger than a rotation angle ΘT1 in the zoom lens barrel 3D) in order to retract the zoom lens barrel 3E from the standard zoom position to the wide end position, the finder unit 4 is set to a magnification position that corresponds to the wide end position accurately.

Because of these variations, the same finder unit can be applied to zoom lens barrels each having a different rotation angle of the rotary frame, which allows for the same focal length up to the wide end or tele end even though the zoom range is different. As a result, the scope of the application of this camera is widened.

According to the camera of the present invention, a single finder optical system having variable power can be made to correspond to any one of a plurality of zoom photographic optical systems each having a different zoom range. Thus, when it is desired to replace the zoom photographic optical system, the finder optical system does not have to be redesigned. This shortens product development and reduces part production cost. Additionally, the setting and installation of the finder optical system and photographic optical system can be adjusted easily.

Although the present invention has been described in elation to particular embodiments thereof, many other variations and modifications and other uses will become apparent to those skilled in the art. It is preferred, therefore, that the present invention be limited not by the specific disclosure herein, but only by the appended claims.

What is claimed is:

1. A camera comprising:
   a photographic optical system capable of changing magnification in a predetermined variable magnification range;
   a finder optical system capable of changing magnification in a variable magnification range which is wider than the predetermined variable magnification range of said photographic optical system at least at a wide side thereof; and
   a driving unit capable of driving said photographic optical system and said finder optical system so as to change the magnification.

2. A camera according to claim 1, wherein said variable magnification range of the finder optical system is wider than the predetermined variable magnification range of said photographic optical system at a tele side thereof.

3. A camera comprising:
   a camera main body capable of receiving selectively a first photographic optical system which has a first variable magnification range and at least one second photographic optical system having a second variable magnification range different from said first photographic optical system thereon; and
   a finder unit having a finder optical system capable of selectively changing a magnification range thereof to correspond to said first photographic optical system and to said at least one second photographic optical system.

4. A camera according to claim 3, wherein said finder unit has a cam member capable of shifting a variable magnification optical system of said finder optical system to change the magnification over said variable magnification range of said first photographic optical system and said variable magnification range of said second photographic optical system.

5. A camera according to claim 4, further comprising a power driving unit for driving said cam member and said photographic optical system installed on said camera main body to change the magnification.

6. A camera comprising:
   a camera main body having selectively installed thereon a first barrel and a second barrel, said first barrel having a first photographic optical system capable of changing the magnification in a first variable magnification range, said first barrel being capable of engaging said first photographic optical system at a predetermined variable magnification state, said second barrel having a second photographic optical system having a second variable magnification range overlapping at least part of said first variable magnification range, said second barrel being capable of engaging said second photographic optical system at said predetermined variable magnification state;
   a finder unit having a finder optical system capable of changing the magnification corresponding to said first variable magnification range and said second magnification range;
   and a finder engaging mechanism capable of engaging said finder optical system at a variable magnification condition corresponding to said predetermined variable magnification state.

7. A camera according to claim 6, further comprising a cam member capable of shifting a variable magnification optical system of said finder optical system over said first variable magnification range and said second variable magnification range.

8. A camera according to claim 7, further comprising:
   an electric driving unit for driving said cam member and said first barrel or said second barrel installed on said camera main body; and
   a transmitting mechanism for transmitting a driving force from said electric driving unit to said first barrel or said second barrel installed on said camera main body and said cam member.

9. A camera comprising:
   a finder unit having a finder optical system capable of corresponding to a first photographic optical system variable magnification range and a second photographic optical system variable magnification range overlapping at least part of said first photographic optical system variable magnification range;
   an engaging mechanism for engaging said finder optical system at a state corresponding to a predetermined variable magnification within a range in which said first photographic optical system variable magnification range overlaps said second photographic optical system variable magnification range; and a camera main body capable of receiving one of a first barrel having a first photographic optical system containing said first photographic optical system variable magnification range and a second barrel having a second photographic optical system containing said second photographic optical system variable magnification range, wherein said first barrel is capable of engaging said first photographic optical system at said predetermined variable magnification state and said second barrel is capable of engaging said second photographic optical system at a same variable magnification as said first photographic optical system.

10. A camera according to claim 9, wherein said finder unit has a cam member for shifting a variable magnification optical system of said finder optical system so as to change the magnification over said first photographic optical system variable magnification range and said second photographic optical system variable magnification range.

11. A camera according to claim 10, wherein said finder optical system is a real image finder optical system.

12. A camera according to claim 10, wherein said variable magnification optical system is a lens shifted in the direction of the optical axis of said finder optical system to change the magnification of said finder optical system.

13. A camera according to claim 10, further comprising an electric driving unit for driving said cam member and a first barrel or a second barrel installed on said camera main body.

14. A camera comprising:

a camera main body allowing any one of a first lens barrel having a first photographic optical system capable of changing focal length in a first range, a second lens barrel having a second photographic optical system capable of changing the focal length in a second range overlapping at least part of said first range and expanded to the side of short focal length, and a third lens barrel having a third photographic optical system capable of changing the focal length in a third range overlapping at least part of said first and said second range and at least extended to the side of long focal length with respect to said first range and said second range;

a finder unit having a finder optical system capable of changing the magnification corresponding to said first range, said second range and said third range;

an engaging mechanism capable of engaging said finder optical system at a predetermined variable magnification state; and an electric driving unit for driving said finder optical system and the photographic optical system of the lens barrel installed on said camera main body to change the magnification, wherein said first lens barrel contains a first engaging mechanism for engaging said first photographic optical system at a focal length corresponding to said predetermined variable magnification state, said second lens barrel contains a second engaging mechanism for engaging said second photographic optical system at a focal length corresponding to said predetermined variable magnification state and said third lens barrel contains a third engaging mechanism for engaging said third photographic optical system at said predetermined variable magnification state.

15. A camera according to claim 14, further comprising a cam member for shifting a variable magnification optical system of said finder optical system to change the magnification within said first range, said second range and said third range.

16. A camera according to claim 15, further comprising a decelerating mechanism for decelerating and transmitting a driving force from said electric driving unit to said cam member, wherein said decelerating mechanism is capable of changing a deceleration rate based on the kind of a lens barrel installed on said camera main body.

17. A camera comprising:

a photographic optical system capable of changing magnification between a predetermined first focal length and second focal length;

a lens barrel having said photographic optical system and driven so as to change the magnification, said lens barrel being engageable at a predetermined focal length between said first focal length and said second focal length; and a finder optical system engaging said lens barrel at said predetermined focal length and capable of selectively changing a magnification range thereof to a variable magnification range of said photographic optical system.

18. A camera according to claim 17, wherein said finder optical system is engageable at said predetermined focal length of said photographic optical system.

19. A camera according to claim 18, further comprising a cam member for shifting a variable magnification optical system of said finder optical system to change magnification of said finder optical system, said cam member being engaged at a predetermined shifted state corresponding to said predetermined focal length of said lens barrel.

20. A camera according to claim 17, further comprising:

a driving unit for driving said lens barrel; and a transmitting mechanism for transmitting a driving force from said driving unit to said lens barrel, wherein said lens barrel has a rotating ring rotated around the optical axis of said photographic optical system by a driving force transmitted by said transmitting mechanism to drive said photographic optical system to change magnification, and wherein by engaging said rotating ring at a predetermined rotation position, said photographic optical system is engaged at said predetermined focal length.

21. A method of manufacturing a camera comprising:

selecting any one of a plurality of photographic optical systems each having a different variable magnification range;

installing a lens frame unit corresponding to a variable magnification range of a selected photographic optical system on a camera main body;

providing said lens frame unit at a predetermined variable magnification state;

providing a finder unit having a finder optical system capable of variable magnification corresponding to a variable magnification range of said plurality of photographic optical systems at said predetermined variable magnification state;

installing said finder unit on said camera main body; and releasing engagements of said lens barrel unit and said finder unit.

22. A method according to claim 21, wherein said predetermined variable magnification state is a focal length that is commonly included in magnification ranges of said plurality of photographic optical systems.

23. A method of manufacturing of a camera comprising the steps of:

selecting any one of a plurality of photographic optical systems having variable magnification ranges that differ from one another;

installing a lens frame corresponding to a variable magnification of the selected photographic optical system to a camera main body;

providing said lens frame unit at a predetermined variable magnification condition;

providing a finder unit having a finder optical system capable of changing magnification corresponding to the variable magnification ranges of the plurality of the photographic optical systems at a variable magnification condition which corresponds to the predetermined variable magnification condition; and installing the finder unit on camera main body.

24. A method according to claim 23, wherein the predetermined variable magnification condition is a focal length possessed by every photographic optical system in the variable magnification ranges of the plurality of photographic optical systems.

* * * * *